Jan. 22, 1957    C. J. BORKOWSKI ET AL    2,778,949
ELECTROSTATIC PULSE ANALYZER SYSTEM
Filed April 6, 1954                                4 Sheets-Sheet 1
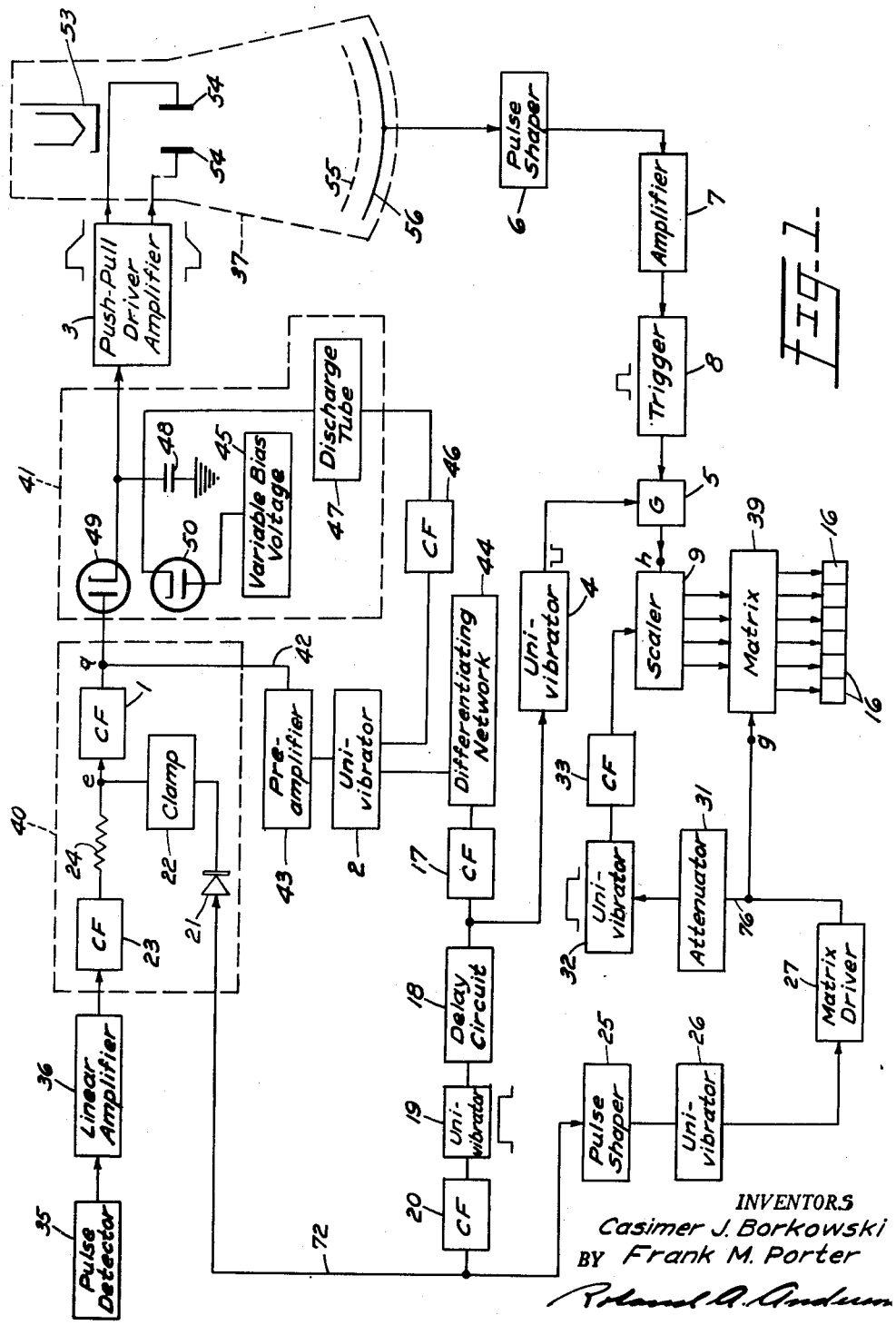
INVENTORS
Casimer J. Borkowski
BY Frank M. Porter
ATTORNEY

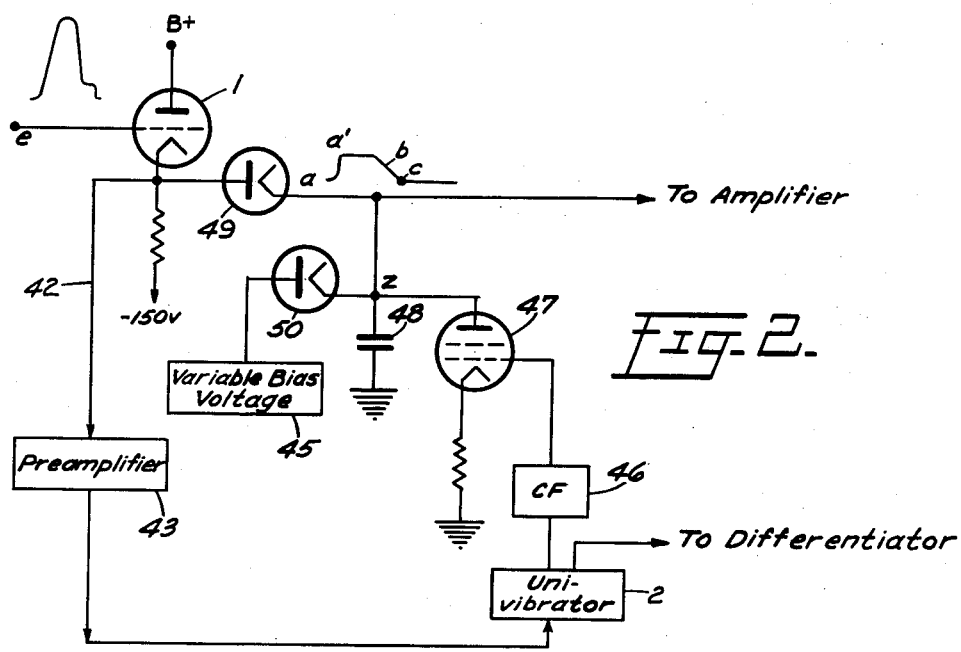
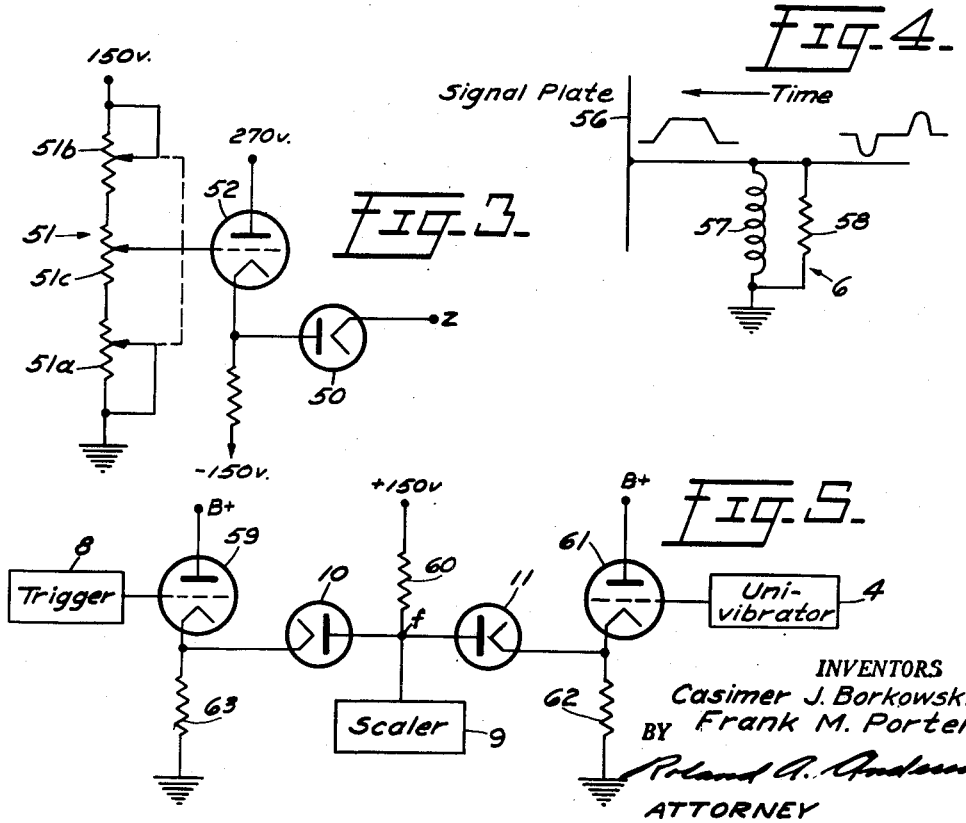

INVENTORS
Casimer J. Borkowski
Frank M. Porter
BY
*Roland A. Anderson*
ATTORNEY

Jan. 22, 1957   C. J. BORKOWSKI ET AL   2,778,949
ELECTROSTATIC PULSE ANALYZER SYSTEM
Filed April 6, 1954   4 Sheets-Sheet 4
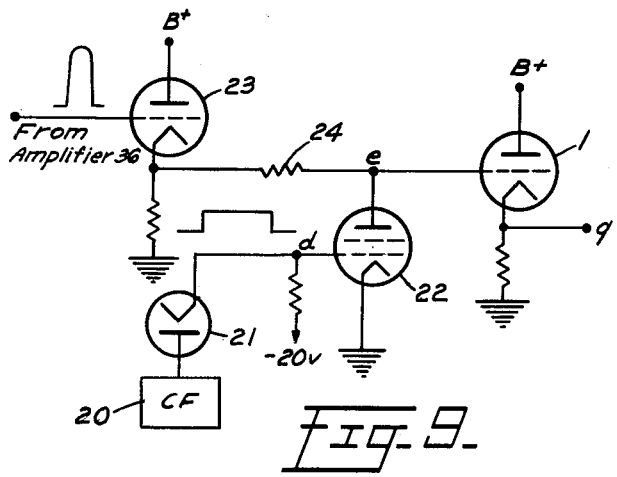
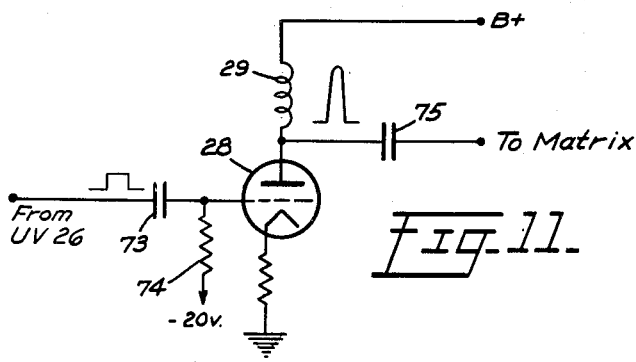
INVENTORS
*Casimer J. Borkowski*
BY *Frank M. Porter*
ATTORNEY

United States Patent Office 2,778,949
Patented Jan. 22, 1957

2,778,949

ELECTROSTATIC PULSE ANALYZER SYSTEM

Casimer J. Borkowski and Frank M. Porter, Oak Ridge, Tenn., assignors to the United States of America as represented by the United States Atomic Energy Commission Application April 6, 1954, Serial No. 421,464

13 Claims. (Cl. 250—83.3)

This invention relates to pulse analyzers and more particularly to a multi-channel pulse analyzer wherein the magnitude of a pulse is measured as a function of the number of impulses produced in the system by an electrostatic analyzer.

The ideal system for determining the voltage-pulse distributions from scintillation spectrometers, proportional-counter spectrometers, or pulse ion chambers would measure the amplitude of every pulse from the detector with the required precision and sort these pulses into as many channels as may be required. For such an ideal system to provide the desired performance, a multi-channel analyzer with from 50 to 100 channels might be necessary. However, such a system would necessarily be complex and involve a great number of elements if conventional components and circuitry were employed. This would introduce unusual problems resulting from changes in tube characteristics, drifts of bias of the various channels off calibration, and changes in supply voltages which would alter operating characteristics of the various channels. Thus, the number of channels which may be associated together using conventional triggers and anti-coincidence circuitry to define each channel edge are limited because of the difficulties encountered in keeping the channel widths constant, and the equipment properly calibrated, aligned and cooled.

Applicants, with a knowledge of these problems and limitations on the analyzers of the prior art, have for an object of their invention, the provision of a single trigger type multi-channel pulse analyzer which may be adapted to systems over a wide range of channels.

Applicants have, as another object of their invention, the provision of a multi-channel pulse analyzer wherein variations in the trigger sensitivity with time have a negligible effect on the channel widths.

Applicants have, as a further object of their invention, the provision of a pulse analyzer wherein the amplitude of a pulse is measured as the function of electrical impulses which are produced in response thereto and correspond in number to the magnitude of the pulse.

Applicants have, as a still further object of their invention, the provision of a system which converts pulse height into a series of pulses which number corresponds to the height of the pulse being measured, counting the pulses thus produced and then cataloguing and recording these pulses.

Applicants have, as a still further object of their invention, the provision of an electrostatic analyzer system wherein the pulses fed thereto are measured in terms of their height by a series of electrical impulses initiated by the trailing edge of the pulse.

Other objects and advantages of our invention will appear in the following specification and accompanying drawings, and the novel features thereof will be particularly pointed out in the annexed claims.

In the drawings,

Fig. 1 is a schematic of our improved system for analyzing pulses.

Fig. 2 is a schematic of the bias control and pulse shaper used in our improved system.

Fig. 3 is a schematic of the variable bias circuit used in our improved analyzer system.

Fig. 4 is a schematic of a pulse shaping network suitable for use in our improved analyzer.

Fig. 5 is a schematic of a suitable form of gate for use in the scaler circuit of our system.

Fig. 9 is a schematic of the gate circuit employed in the input of the analyzer.

Fig. 10 is a schematic of the type of impulse produced at the signal plate of the electrostatic analyzer.

Fig. 11 is a schematic of the matrix driver used in our improved system.

Figure 6:
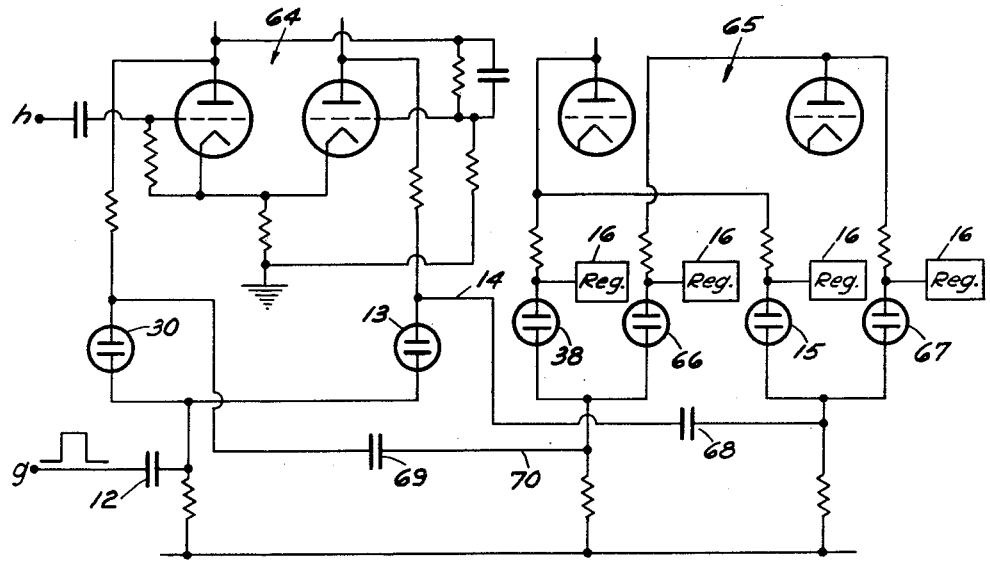
Fig. 6 is a schematic of a portion of the scaler and the matrix employed in our improved analyzer.

Referring to the drawings in detail, and particularly to the circuit of Fig. 1, a pulse detector 35 of any suitable type, and may be the usual scintillation spectrometer, is employed to feed pulses into a linear amplifier 36 for amplification. The amplified pulse output from the linear amplifier 36 is then fed through a gate 40 to a pulse shaper 41. The gate acts to prevent the passage of additional pulses through the system when a pulse is already being analyzed therein.

The action of the gate 40 is controlled by control circuit 42 which is fed from the output of the gate. It includes a preamplifier 43 for increasing the magnitude of the control signal, and a univibrator 2 which produces rectangular pulses as a result of signals fed thereto. One output of the univibrator 2 is fed through a differentiating network 44 to a cathode follower 17. Part of the output of the cathode follower 17 is then fed through a delay circuit 18 of conventional type, which will delay the control signal long enough to permit the pulse to be analyzed to get through the gate 40 without being clipped. This delayed signal is then fed to a second univibrator 19 which produces a pulse of sufficient width to close the gate for the duration of time required by the system to analyze the pulse, and the rectangular pulses from univibrator 19 are fed to a cathode follower 20. Part of the output of the cathode follower 20 is fed into the gate 40 where it serves to close the gate and prevents passage of subsequent pulses until the pulse already in the system has been analyzed.

The gate 40 in the input circuit of the analyzer is shown in Fig. 9 and includes a cathode follower 23 coupled to and fed by the output of linear amplifier 36. The output is coupled through a resistor 24 to the control grid of a second cathode follower 1. Bridged across this circuit to ground is a clamp 22 which takes the form of a pentode, the input of which is coupled through diode 21 to the control circuit 42 through the cathode follower 20, mentioned above. The rectangular pulse from the univibrator 19 of the control circuit 42 is fed through the cathode follower 20 and diode 21 to the control grid of the clamp 22. Clamp 22 is normally biased to cut off, so the rectangular pulse passing through diode 21 raises the potential of the point $d$ until clamp 22 conducts. The flow of current through clamp 22 creates a drop across the resistor 24 and lowers the potential of the point $e$ to the extent that a larger portion of the current flow across clamp 22 is shifted to the screen of that tube and away from the plate. Now if a pulse arrives at the input of cathode follower 23 while the plate is in this condition, the cathode follower 23 conducts and this raises the potential of the cathode which in turn tends to raise the potential at point e which causes the current flow from clamp 22 to shift back from the screen to the plate, clamping the control grid of tube 1, which is connected thereto, so that no signal can get through tube 1.

The pulse which passes through the gate to be analyzed is fed into a pulse shaper 41 before passing into the electrostatic analyzer 37. In this pulse shaper the upper part of the pulse is clipped off and passed on through the circuit. This upper portion after being clipped from the pulse is reshaped and the trailing edge thereof stretched so as to present a pulse shape which is more suitable for analysis by the electrostatic analyzer.

One form of pulse shaper suitable for this purpose is schematically shown in Fig. 2. The cathode follower in the pulse measuring channel is coupled to diode 49 which feeds the push-pull amplifier for the electrostatic analyzer. The univibrator 2 of the control channel 42, previously mentioned, has a second output which feeds through cathode follower 46 and provides a negative rectangular pulse for the input discharge tube 47, which is biased so that it is normally operating. The output of tube 47 is coupled across condenser 48 which is, in turn, connected to the cathode of diode 49 in the analyzer channel. Condenser 48 is also coupled through the cathode of diode 50 to the variable bias voltage source 45. Point $a'$ represents the peak of the pulse which is to be analyzed. As the upper portion of the pulse passes through the diode 49, it can be stored up in the condenser 48. This is made possible by the action of the control circuit 42 which responds to the lower portion of the leading edge of the pulse and prepares the pulse shaper by triggering the univibrator 2 to send out a negative pulse of greater width than that of which point $a'$ is the peak, to the control grid of discharge tube 47 and this serves to cut it off. This permits the condenser 48 to build up a charge which it will hold until the negative pulse from the univibrator has died out. Thus, the pulse so formed rises sharply as indicated at $a$ until it reaches a peak corresponding in magnitude to $a'$. However, since discharge tube 47 is maintained inoperative by the negative pulse from the univibrator 2, this peak is held by the storing of the charge on the condenser 48. Then, as the control pulse from univibrator 2 decays, the discharge tube 47 commences to operate and the charge leaks off of condenser 48. The wave will then slant downwardly along the line $b$ until it reaches the point $c$. At this point the variable bias 45 is set to supply current through diode 50 to the condenser 48 maintaining the charge at that level as the discharge tube 47 continues to operate and draw current.

The variable bias source 45 may take any suitable form, but the one shown in Fig. 3 is preferred. It includes a voltage divider which is generally indicated at 51. The lower and upper resistor banks are designated 51a, 51b and are ganged together. The central resistor bank 51c has a movable contact which serves as the input to the control grid of a cathode follower 52 and feeds the diode 50. It will be apparent that by connecting the movable contacts of banks 51a, 51b, adjustment of the position of bank 51c relative to ground may be made without altering the potential across bank 51c, since the gang control of resistor banks 51a and 51b are interlocked so that banks 51a and 51b are moved together so that adjustment removes resistance from the divider in one of these banks, and adds an equal amount of resistance in the other of these banks. Then, if this relative position is desired to be adjusted, this is accomplished by the movable contact on resistor bank 51c.

Figure 7:
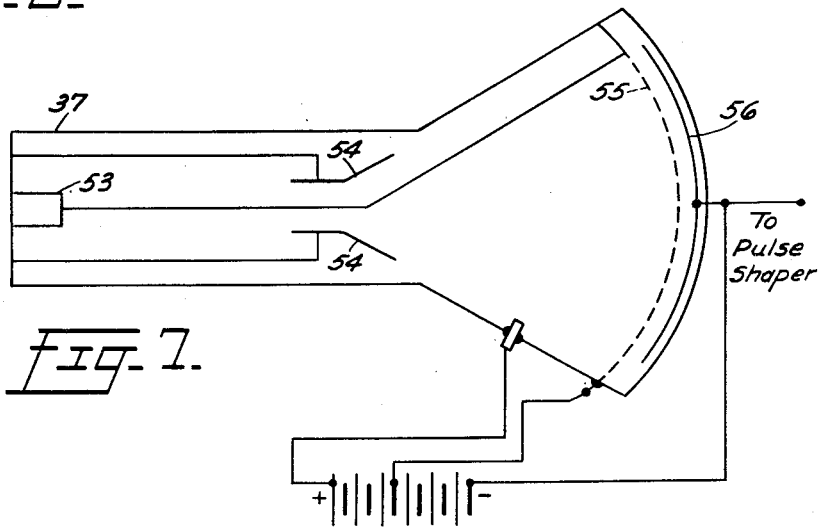
Fig. 7 is a schematic of the modified cathode ray tube used as the electrostatic analyzer in our improved system.
Figure 8:
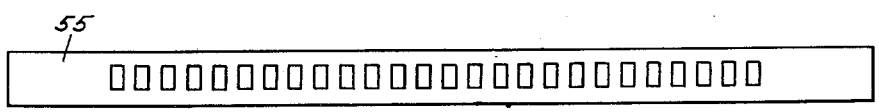
Fig. 8 is a plan view of the grid used in our modified cathode ray tube analyzer.

In order to insure that a proper deflection may be made of the beam of the electrostatic analyzer, the potential level of the pulse may be raised by coupling the output of the pulse shaper 41 into a push-pull amplifier 3 whose output is fed into a pair of deflection plates of the electrostatic analyzer 37 as shown in Fig. 1. This electrostatic analyzer may take the form of a modified cathode ray tube as indicated in Fig. 7. The cathode ray tube 37 has a source 53 of electrons such as a heated cathode and accelerating electrodes of conventional type, the usual opposed deflection plates 54, 54 which act on the beam, a slotted grid element 55, and a collector electrode 56. The cathode-ray beam is deflected vertically across a metal grid as shown in Fig. 7. The particular grid shown has 25 blank spaces and 25 webs of the same width as the spaces. However, the later grids had many more spaces and webs than this one. Behind the grid is an Ag-Mg metal signal plate that is negative with respect to the grid and has a secondary emission ratio of about 4. A pulse is obtained from the signal plate each time the beam passes an opening in the grid.

To utilize the spaces, as well as the webs, as channels, it is necessary for the beam to return to the zero position. Thus, for full deflection, the beam would pass through 25 spaces on the rise of the pulse and 25 spaces on the fall; as a result, fifty pulses would normally be obtained from the signal plate, thus indicating that the pulse fell into the 50th channel. With this type of grid construction there are no gaps or overlapping of channels, and a maximum output signal is obtained. Since the leading edge of the pulse from amplifier 3 consumes a relatively short time, that is, the rise time of the pulse is small when compared with the fall time, it is desired to measure the pulse by the trailing edge. Even so, the time factor is such as to permit electrical impulses to be set up by the beam in the electrostatic analyzer in response to the leading edge of the pulse.

If used, this rising edge of the pulse would create a large number of different impulses of varying size and shape which would not fully conform to the shape of the leading edge of the pulse because of the different times spent by the beam over different slots. Such impulses would be difficult to count, but this is obviated by preventing the system from responding to the leading edge of the pulse and confining the response to the trailing edge thereof. This is accomplished by gating the output circuit of the electrostatic analyzer 37 before it reaches the scaler 9.

The pulse to be analyzed produces a series of pulses at the plate 56 of the character indicated in Fig. 10. These pulses coming out of the cathode ray tube, if passed through an A. C. amplifier, would have their base lines distorted, since the rate of arrival of pulses to be measured at the analyzer input is a random occurence in time, causing greater uncertainty in the operation of trigger circuit 8, and this might result in its failure to respond to marginal voltage signals or be operated in response to sub-marginal voltage signals which are initiated by the action of current signals from the electrostatic analyzer 37 when passed through a resistor. To overcome this tendency, and also the tendency of such an arrangement to produce unsatisfactory pulses, the current signals from collecting plate 56 are fed to a pulse shaping network 6. This network, shown in Fig. 4, comprises an inductance 57 which differentiates the current pulse to form a pair of voltage pulses. With time indicated as extending from right to left, the leading edge of the current pulse when differentiated, forms a positive voltage pulse and the trailing edge of the current pulse, when differentiated, forms a negative voltage pulse. The shunting resistor 58 is of such a value as to provide critical damping of the inductance. This has the effect of damping out the unwanted oscillations.

The differentiated signals from the pulse shaper 6 are fed into amplifier 7 to raise their magnitude to such a level as will be more appropriate for operating the trigger circuit 8. The trigger circuit may be of any suitable type, but preferably takes the form of a Schmidt trigger circuit. See "Electronics" by Elmore and Sands, published by McGraw-Hill Book Company of New York, N. Y., 1949 edition, page 99. This trigger circuit acts very much like a univibrator by producing a rectangular wave in response to a pulse, but differs from the univibrator by providing a pulse whose width is proportional to the width of the triggering signal or impulse.

The rectangular pulses coming out of the trigger circuit 8 are fed to the scaler 9 through gate 5. The operation of the gate is controlled from the control circuit 42 where undelayed but differentiated pulses are fed to univibrator 4 which provides a negative pulse for closing the gate 5 for a short interval upon the arrival of a pulse to be analyzed.

A suitable form of gate for the above purpose is illustrated in Fig. 5. In this arrangement, diode 10 is normally conducting and cathode follower 59 may also be conducting to some extent, since the 150 volt potential impressed thereacross through resistor 60 is sufficient to overcome the effect of the drop in cathode resistor 63. A positive pulse from the trigger 8 is passed through cathode follower 59 and impressed upon the cathode of diode 10, raising its potential and causing the diode to conduct less. This has the effect of raising the potential of point $f$, and the signal from the electrostatic analyzer 37 will be fed to scaler 9. However, if a negative signal from the univibrator 4 is present, it will be passed through the cathode follower 61 and applied to the cathode of diode 11. The diode 11 is normally non-conducting because of the substantial drop across the cathode resistor of the normally operative cathode follower 61, but when the negative pulse of univibrator 4 is applied to the cathode of diode 11, it is rendered conductive. With the diode 11 conducting, point $f$ will not rise even though diode 10 receives a positive pulse at its cathode. This prevents scaler 9 from counting pulses from the trigger 8. In this connection, it may be noted that diodes 10 and 11 provide parallel paths to ground from the 150 volt potential source, and while diode 10 is normally operative, diode 11 is normally inoperative. This may be accomplished by either using a larger resistor in the cathode circuit of tube 61 to produce a greater drop, or permitting more current to flow through the cathode resistor 62 than through the cathode resistor 63. This may be done by using a different bias on tube 61 than is provided for tube 59.

The scaler 9 may be of any suitable type such as the Higginbotham type scaler described in volume 18 of "The Review of Scientific Instruments," page 706, and in the co-pending application of Gulley, Patent No. 2,676,756, granted April 27, 1954. However, once the scaler has recorded the number of counts proportional to the amplitude of the pulse being analyzed, an element is required which will decode the recorded counts from the scaler and actuate the appropriate storage channel. For this purpose a channel selecting matrix is utilized. While any desired type of matrix may be chosen, Fig. 6 shows so much of a preferred form of one type of matrix together with a portion of a scaling circuit, as is necessary to indicate the manner of operation and the cooperation of the elements of these two devices in the system. In this arrangement, signals which have been passed by the gate 5 in response to the action of the pulse which is being analyzed, reach the input to the scaler 9 at point $h$ and are counted by it in the usual manner. For convenience, only two stages, 64, 65, of this conventional multi-stage scaler are indicated.

When the count of the impulses resulting from the pulse which is being analyzed is completed by the scaler 9, a rectangular pulse is applied to the system at point $g$ from a univibrator 26 and matrix driver 27 which responds to the control signal from channel 42. This signal coming in at point $g$ is coupled into the first stage of the matrix through a coupling condenser 12. The first stage of the matrix includes a pair of neon discharge tubes 30, 13 connected in the plate circuits of the flip-flop tubes of the first stage 64 of the scaler. The neon discharge tube corresponding to the operative tube of the stage glows during its operation. The circuits of tubes 30, 13 of the first stage are then coupled through condensers 69, 68, respectively, to the plate circuits of the tubes of the second stage 65 of the scaler. However, the second stage of the matrix, which is connected to the second stage of the scaler, has two circuits for each tube of the second stage 65. This is necessary to complete a possible circuit from each of the neon tubes 30, 13 to each of the tubes of the second stage of the scaler. Thus, the second stage of the matrix will have four neon tubes, 38, 66, 15 and 67. Neon tubes 38, 66 can complete a circuit from neon tube 30 through line 70 to either of the tubes of the second stage of the scaler. Likewise, neon tubes 15, 67 can complete a circuit from neon tube 13 to either of these same tubes of the second stage of the scaler via neon tubes 15, 67. The circuits of neon tubes 38, 66, 15 and 67 are then coupled into conventional registers or counting circuits generally designated 16.

The signal fed into the matrix at point $g$ is sufficiently narrow with respect to time that it will not cause conduction of an extinguished neon tube. Now, if the second tube of stage one of the scaler is operating, neon tube 13 will be conducting. The signal will then pass through neon tube 13 and through line 14 and coupling condenser 68 to the second stage of the scaler. Then, if the first tube of the second stage of the scaler is operating, neon tube 15 will be conducting, so the signal will pass through this neon tube and on to the recorder 16 coupled thereto, and be recorded. Therefore, it is seen that the matrix by its signal which only traverses the path of conducting neon tubes, selects the tube in each stage of the scaler which is operating, and insures that the proper recorder will act to record the count or condition of the scaler resulting from the reception of the impulses from the electrostatic analyzer, before such scaler is reset for counting the next series of impulses. It will be apparent that the number of recorder channels will double with each increase in the number of stages of the scaler. Thus, with a three-stage scaler, the number of neon tube channels will increase to eight, and with a four-stage scaler the number of neon tube channels will reach sixteen.

The matrix driver 27 which may be used with this system is indicated schematically in Fig. 11 and comprises a coupling condenser 73 for the grid circuit of tube 28 which is biased to cut off through resistor 74 from a source of negative potential. An inductance 29 is inserted in the plate circuit of the tube, and the tube output is coupled through condenser 75 to the matrix at point $g$. It is also coupled to a control circuit 76 for resetting the scaler after each count has been completed and recorded. When a pulse from the univibrator 26 is impressed upon the input of the tube 28, it is caused to conduct, setting up a field in the inductance 29. Upon decay of the pulse, the tube 28 will cease to conduct and the field in the inductance will collapse. This results in the production of a large positive pulse in the output of tube 28 which is fed to the matrix 39 at point $g$, and to the control circuit 76.

From the above description of the system, it will be apparent that in its operation, a pulse from the detector 35 will be amplified in amplifier 36, and if no other pulse is being analyzed by the system, the gate 40 will be opened and the pulse will pass through it. However, in order to protect the system against the possibility of false operation, and to permit all of the pulses to be analyzed, the leading edge of the pulse is fed through control circuit 42 and initiates a rectangular pulse in the univibrator 2. After differentiation in the network 44, the sharpened up leading positive pip is passed through a delay circuit 18 to the univibrator 19. The purpose of the delay circuit is to delay the pip and, therefore, the closing of the gate 40 until the whole of the pulse to be analyzed has passed through it, and thereby obviate the possibility of clipping off a portion of this pulse. It is particularly important that the gate remain open until the pulse to be measured has commenced to fall, otherwise, the condenser 48 in the pulse stretcher may not be charged to the peak amplitude of the pulse to be measured. Upon being triggered by the pip, the univibrator 19 sends out a wide rectangular pulse of such width and duration that when applied to the gate 40 it will close the gate for a period sufficiently long to permit the system to analyze the pulse before admitting a second pulse through the analyzer.

The pulse upon initiating action through the control circuit 42 to close the gate 40 also passes through pulse shaper 41 where the upper portion is clipped off and shaped to provide a flat top of appreciable width and a long, downwardly slanting trailing edge. This pulse after being stretched and shaped is amplified in push-pull amplifier 3 to increase its amplitude as indicated in Fig. 1. It is applied to the opposite deflection plates of the electrostatic analyzer 37 and causes the beam of electrons created by the source 53 to be deflected in accordance with the shape of the pulse. However, since the leading edge of the pulse is steep, it will not provide a very reliable means for analysis in this analyzer, so it is desired to measure the pulse as a function of the impulses sent out by the action of the beam of the analyzer in its movement back down the grid to normal position. In this connection, it will be apparent that as the beam of the electrons traverses the length of the grid during its deflection or return from a deflection, it will fall through successive slots in grid 55 and as it strikes the collector plate 56 will produce electrical impulses of negative character, since the beam is made up of electrons. These impulses will be generally rectangularly shaped with leading and trailing edges that will slant in opposite directions, as indicated at 71 in Fig. 10. This is particularly true of the current impulses resulting from the trailing edge of the pulse being analyzed. Impulses being produced as a result of the action of the forward edge of the pulse under analysis are not so uniform. The current impulses from the signal plate 56 of electrostatic analyzer are then converted into differentiated voltage pulses in pulse shaper network 6, with the forward positive sharpened impulse or pip being employed to operate the trigger 8 and produce a rectangular pulse. However, since it is not desirable to attempt to count the impulses initiated by the forward edge of the pulse being analyzed, due to the unreliability of the response of the trigger circuit 8 to such pulses, the gate 5 is closed in response to the positive leading pip from the differentiating network 44 which was initiated by the leading edge of the pulse being analyzed when it passed through the control system 42. This pip triggers univibrator 4 to send out a negative rectangular shaped pulse which closed the gate 5, but the width of this negative rectangular pulse from univibrator 4 is made such that its decay will occur slightly prior to the beginning of the electrical impulse which results from the analysis of the trailing edge of the pulse which is being analyzed in the electrostatic analyzer 37. In this way, the gate 5 is permitted to open and pass the desired latter impulses initiated in the analyzer 37. These impulses enter the scaler 9 and operate it in the conventional manner to count the total number of impulses fed thereto. When this count is completed in the scaler 9, a control signal is initiated by feeding the rectangular pulse from the univibrator 19 through control circuit 72 to the pulse shaper 25. The pulse shaper 25 may be a simple coupling condenser which differentiates the rectangular wave from the univibrator 19 so that the trailing negative pip may trigger univibrator 26 to produce a positive rectangular pulse which is fed to the matrix driver 27. This is converted by the matrix driver into a large positive pulse and serves as the input signal at point g for the matrix. The matrix 39 responds to this signal and causes the count set up on the scaler to be transferred to the proper recorder 16. The matrix driver also feeds its large output pulse to an attenuator 31 in control circuit 76 where it is attenuated and cut down and then it is fed to a univibrator 32 which produces a rectangular wave of substantial width. This signal is then passed through a cathode follower 33 and applied to the scaler 9 for resetting it in the usual manner to prepare it for counting the next set of impulses from the electrostatic analyzer, at the time when the next pulse is admitted for analyzing. There is sufficient delay in the recovery of the matrix that the input to the matrix and the reset scaler may be applied simultaneously and the input pulse to the matrix will follow the path through the matrix which was set up prior to the occurrence of the reset signal.

While this invention may have many uses, one application is to measure the energy of neutrons in a time of flight system. The synchronizing pulses from the neutron shutter, for example, would turn on the cathode ray beam that is driven by a linear rising triangular pulse. The pulse from the neutron detector would turn off the beam. The number of pulses obtained from the signal plate would determine the time of flight of the neutron, that is, its energy.

By this method, stable time channels 0.1-$\mu$second wide could be used.

Having thus described our invention, we claim:

1. A pulse height distribution analyzer comprising a detector sensitive to radiation for producing pulses, an electrostatic analyzer fed by the detector for producing electrical impulses whose number corresponds to the magnitude of the pulse, and a scaler for sorting and counting a portion of the impulses from the analyzer.

2. A pulse height distribution analyzer comprising a radiation detector for producing pulses, an electrostatic analyzer fed by the detector for producing electrical impulses corresponding in number to the magnitude of the pulses, a scaler coupled to the analyzer for sorting and counting the impulses, and a gate interposed between the analyzer and the scaler for passing the impulses from the analyzer initiated by the trailing edge of each pulse.

3. A pulse height distribution analyzer comprising a radiation detector for converting radiations into pulses, an electrostatic analyzer coupled to the radiation detector for converting pulses into electrical impulses corresponding in number to the magnitude of the pulses, a pulse shaper interposed between the radiation detector and the analyzer, and a scaler for sorting and counting a portion of the impulses from the analyzer.

4. A pulse height distribution analyzer comprising a radiation detector for converting radiations into pulses, an electrostatic analyzer coupled to the radiation detector for producing electrical impulses corresponding in number to the magnitude of the pulses, a pulse shaper for stretching the trailing edge of the pulses, a scaler fed by the analyzer for sorting and counting the pulses, and means interposed between the scaler and the analyzer for passing the impulses resulting from the trailing edge of the pulses.

5. A pulse height distribution analyzer comprising a radiation detector for converting radiations into pulses, an electrostatic analyzer for producing electrical impulses corresponding in number to the magnitude of the pulses, means interposed between the detector and analyzer for limiting the passage of pulses while a pulse is being analyzed by the analyzer, and a scaler fed by the analyzer for sorting and counting a portion of the impulses therefrom.

6. A pulse height distribution analyzer comprising a radiation detector for converting radiation into pulses, a pulse shaper for stretching the trailing edges of the pulses, and an electrostatic analyzer coupled to the pulse shaper for converting the pulses into electrical impulses corresponding in number to the heights of the pulses, means interposed between the detector and the pulse shaper for limiting the passage of pulses while a pulse is being analyzed, and a scaler coupled to the analyzer for sorting and counting a portion of the pulses therefrom.

7. A pulse height distribution analyzer comprising a radiation detector for converting radiations into pulses, an electrostatic analyzer for producing a series of electrical impulses corresponding in number to the magnitude of the pulses, means interposed between the radiation detector and the analyzer for limiting the passage of pulses during the period when a pulse is being analyzed, a scaler fed by the analyzer for sorting and counting the impulses, and means between the analyzer and scaler for passing only impulses resulting from the trailing edge of the pulses.

8. A pulse height distribution analyzer comprising a radiation detector for converting radiations into pulses, an electrostatic analyzer for converting pulses into electrical impulses corresponding in number to the magnitude of the pulses, a pulse shaper for coupling the analyzer to the detector for stretching the trailing edges of the pulses, means connected between the detector and the pulse shaper for limiting the passage of pulses when there is a pulse being analyzed in the system, a scaler fed by the analyzer for sorting and counting the impulses, and means interposed between the analyzer and scaler for passing the impulses resulting from the trailing edges of the pulses.

9. A pulse height distribution analyzer comprising a radiation detector for converting radiations into voltage pulses, an electrostatic analyzer for producing a series of electrical impulses corresponding in number to the magnitude of the pulses coupled to the radiation detector, a scaler fed by the electrostatic analyzer for sorting and counting the pulses, and a matrix fed by the scaler for transferring and storing the count.

10. A pulse height distribution analyzer comprising a radiation detector for converting radiations into voltage pulses, an electrostatic analyzer coupled to the radiation detector for producing electrical impulses corresponding in number to the magnitude of the pulses, a scaler fed by the analyzer for sorting and counting the impulses therefrom, a matrix coupled to the scaler for receiving and storing the impulses, and a control circuit responsive to pulses from the detector for providing a delayed signal for application to said matrix to transfer the count of the impulses from the scaler.

11. A pulse height distribution analyzer comprising a radiation detector for converting radiations into voltage pulses, an electrostatic analyzer coupled to the radiation detector for producing electrical impulses corresponding in number to the magnitude of the pulses, a scaler fed by the analyzer for sorting and counting the impulses therefrom, a matrix coupled to the scaler for receiving and storing the count of the impulses, a control circuit coupled to the radiation detector and responsive to pulses therefrom for supplying delayed signals to the matrix for transferring the count of the impulses from the scaler, and additional means for coupling the control circuit to the scaler to supply signals for resetting it.

12. A pulse height distribution analyzer comprising a radiation detector for converting radiations into voltage pulses, a pulse shaper connected to the radiation detector for stretching the trailing edge of the pulses, an electrostatic analyzer coupled to the pulse shaper for producing a series of electrical impulses corresponding in number to the magnitude of the pulses, a gate interposed between the radiation detector and the pulse shaper for limiting the passage of pulses during the time when a pulse is being analyzed, means fed by the analyzer for sorting and counting impulses therefrom, a second gate interposed between the analyzer and the sorting and counting means, and a control circuit coupled to the detector and responsive to the leading edges of the pulses to close the second gate to impulses initiated by said leading edges of said pulses.

13. A pulse height distribution analyzer comprising a radiation detector for converting radiations into voltage pulses, a pulse shaper fed by the radiation detector for stretching the trailing edges of the pulses, an electrostatic analyzer coupled to the pulse shaper for producing a series of electrical impulses corresponding in number to the magnitudes of the pulses, a gate interposed between the detector and the pulse shaper for limiting the passage of pulses when a pulse is being analyzed, a scaler fed by the output of the analyzer for sorting and counting impulses, a second gate interposed between the analyzer and the scaler, a control circuit coupled to the detector and responsive to the forward edges of the pulses reaching the analyzer for closing the second gate to block the passage of pulses initiated by the forward edge of the pulse from reaching the scaler, a matrix coupled to the scaler for receiving and storing the impulses therefrom, and a second control circuit responsive to pulses from the radiation detector for applying delayed signals to the matrix for transferring the count of impulses from the scaler to the matrix.

References Cited in the file of this patent

UNITED STATES PATENTS

| | | |
|---|---|---|
| 2,605,332 | Parsons | July 29, 1952 |
| 2,642,527 | Kelley | June 16, 1953 |

OTHER REFERENCES

"Cosmic Rays," Janossy, 1950, second ed., pub. by Oxford Press, London, England; pages 412–417.

"A Method of Pulse Integration Using the Binary Scale Unit," Glass et al., Rev. of Sci. Inst., February 1952, vol. 23, No. 2, pages 67–72.